United States Patent [19]

Negre

[11] Patent Number: 5,592,904
[45] Date of Patent: Jan. 14, 1997

[54] METHOD AND DEVICES FOR CONTROLLING THE COMBUSTION OF A FOUR STROKE ENGINE

[76] Inventor: Guy Negre, Forum Aurelia, Route du val, Brignoles, France, 83170

[21] Appl. No.: 360,678

[22] PCT Filed: May 2, 1994

[86] PCT No.: PCT/FR94/00503

§ 371 Date: Jan. 26, 1995

§ 102(e) Date: Jan. 26, 1995

[87] PCT Pub. No.: WO94/25743

PCT Pub. Date: Nov. 10, 1994

[30] Foreign Application Priority Data

May 3, 1993 [FR] France .................................. 93 05542

[51] Int. Cl.$^6$ ................. F02B 19/06; F01L 7/02
[52] U.S. Cl. ........................................... 123/52.3
[58] Field of Search .................... 123/182.1, 52.2, 123/52.3, 52.4, 258, 292, 143 A

[56] References Cited

U.S. PATENT DOCUMENTS

| | | | |
|---|---|---|---|
| 1,136,512 | 4/1915 | Daimler et al. ............... | 123/182.1 |
| 1,555,454 | 9/1925 | Bugatti ........................ | 123/52.2 |
| 1,969,815 | 8/1934 | Meyer ......................... | 123/52.3 |
| 1,973,979 | 3/1931 | Fuchs et al. ................. | 123/143 A |
| 2,091,410 | 8/1937 | Mallory ....................... | 123/292 |
| 2,091,413 | 8/1937 | Mallory ....................... | 123/52.3 |
| 2,091,987 | 9/1934 | Honn ........................... | 123/143 A |
| 2,269,948 | 1/1942 | Mallory ....................... | 123/52.3 |
| 3,446,192 | 5/1969 | Woodward .................... | 123/52.3 |
| 4,168,678 | 9/1979 | Nohira et al. ................ | 123/52.3 |
| 4,307,687 | 12/1981 | Holstein ....................... | 123/52.3 |
| 4,414,933 | 11/1983 | Pribnow ....................... | 123/182.1 |
| 4,981,114 | 1/1991 | Skopil . | |
| 5,074,265 | 12/1991 | Ristin et al. . | |

FOREIGN PATENT DOCUMENTS

| | | |
|---|---|---|
| 456673 | 9/1913 | France . |
| 811893 | 4/1937 | France . |

OTHER PUBLICATIONS

International Search Report and Annex in French and English.

Primary Examiner—Marguerite McMahon
Attorney, Agent, or Firm—Greenblum & Bernstein P.L.C.

[57] ABSTRACT

Method and devices for controlling the combustion of a four-stroke engine. For each cylinder, in addition to the main combustion chamber, a smaller secondary combustion chamber is provided. The secondary combustion chamber is completely separate and independently supplied with a compressed fuel-air mixture such that, when the mixture is ignited, the explosion that takes place through a transfer channel into the main combustion chamber, igniting the mixture contained therein. The main combustion chamber is not supplied with fuel at low speeds. Application is also contemplated for four-stroke engines with spark or other ignition and with rotary or valve timing.

28 Claims, 7 Drawing Sheets

METHOD AND DEVICES FOR CONTROLLING THE COMBUSTION OF A FOUR STROKE ENGINE

BACKGROUND OF THE INVENTION

1. Field of the Invention

The invention relates to a method and devices for controlling the combustion of an internal combustion engine functioning according to a four-stroke cycle with spark or other ignition, with valve timing or equipped with a rotary intake and/or exhaust distributor.

2. Description of Background and Relevant Information

The thermodynamic efficiency of the combustion of internal combustion engines is directly proportional to the gas pressure at the end of the compression stroke and consequently to the load of the engine, itself a function of the opening of the accelerator valve. The specific consumption of the engine is related to the thermodynamic efficiency, which amounts to saying that for a given engine displacement the less torque and/or power required the more the specific consumption increases. This is extremely penalizing especially when the engine equips an automobile because the result is that at low speeds and low loads the fuel consumption is very substantial, and consequently so are the polluting exhaust emissions, but, especially in the city, the engine is always used at a low speed and at low loads. To clarify, an automobile engine that consumes at average or full load, approximately 200 to 250 grams of fuel per horsepower and per hour on the highway sees its consumption in the city increased to approximately 1000 or even 2000 grams of fuel per horsepower and per hour.

Conscious of this problem, motorists sought to improve the consumption at low loads in various manners: either by producing engines with poor or very poor mixtures (in the case of stratified load engines); or by trying to obtain variable compression ratio engines in order to try to increase the pressure at the end of compression; or even by "disengaging" one or more cylinders in order to increase the load on the cylinders that remain in operation, for equivalent power.

The solutions have the disadvantage of only very partially resolving the problem and are in addition in certain cases particularly difficult and onerous to implement.

SUMMARY OF THE INVENTION

The method according to the invention enables the engine to function at weak loads with combustion efficiencies equivalent to those obtained at average or full load. The invention also relates to devices for implementing this method.

During operation of the four-stroke engine, the intake gases, after having been drawn into the cylinder by the piston are compressed in the combustion chamber in order to be ignited therein by the spark plug, thereby increasing in volume and pushing the piston, thus obtaining the power stroke also called explosion or combustion. In practice, the volume of the combustion chamber substantially represents between 9 and 12% of the volume of the cylinder according to the chosen compression ratio. The method according to the invention is characterized by the joining to this assembly of a small secondary combustion chamber entirely separated from the principal chamber and supplied independently and separately with compressed intake gas. During average or full load operation, the gases compressed in this small secondary chamber are ignited by a spark plug, while shortly before or substantially after the start of this combustion, this small secondary combustion chamber is connected, by the opening of one (or several) linkage channel, the principal combustion chamber where the combustion of gases issuing from the secondary chamber will then ignite (instead of and in place of the spark plug) the intake gases compressed in the principal combustion chamber. The efficiency of this ignition by "flame jet/burst of flames" issued from the combustion of the secondary chamber also enables utilization in the principal chamber of very poor fuel-air mixtures as well as raised compression ratios ensuring a weak fuel consumption.

During the operation of the engine at low loads, the cylinder and the principal combustion chamber are no longer supplied with fuel, but only with air, and the piston is pushed in the principal cylinder only by the explosion of gases contained in the small secondary combustion chamber, through the linkage channel. One easily understands that the small secondary combustion chamber operates almost continuously at full load with a good thermodynamic efficiency, guaranteeing a low consumption of fuel.

During combustion stroke (or explosion) and exhaust stroke, the volume of the small secondary combustion chamber is maintained substantially constant at its small volume, so that all the efficiency of the explosion of gases during combustion serves to push the engine piston of the principal cylinder, as well as to better empty the small secondary combustion chamber during the exhaust stroke.

During low load operation when the principal cylinder and the principal chamber are no longer supplied with fuel, it is particularly interesting, during the intake and compression strokes, to open a valve in the principal combustion chamber, connecting the latter with the atmosphere, with the object of avoiding the pumping efforts during intake and the counter pressure on the piston during the compression stroke that would uselessly absorb the power.

One thus notes that in the method according to the invention, one distinguishes two modes of operation: average/full load operation, low load operation. The operation cycles of an engine cylinder according to the combustion control method according to the invention are thus the following:

1. When the engine is at average or full loads induction: of air and fuel into the principal cylinder of air and fuel for supplying the small secondary combustion chamber compression: of the mixtures in the two combustion chambers ignition: lighting of the mixture in the small chamber by a spark plug opening: of the linkage channel(s) between the small combustion chamber and the principal combustion chamber, lighting of the mixture in the principal combustion chamber explosion: of the set of combustions (power stroke) during this cycle the volume of the secondary combustion chamber is maintained at its minimum value exhaust: of the gases burned in the engine cylinder and in the small secondary combustion chamber. During this cycle the volume of the secondary combustion chamber is also conserved at its minimum value.

2. When the engine is at low loads:

induction: of air alone into the principal cylinder of air and fuel intended to supply the secondary chamber compression: of the fuel-air mixture in the secondary chamber, opening of the aeration valve of the principal chamber to avoid counter pressure on the piston lighting: of the fuel-air mixture in the secondary chamber, closure of the aeration valve of the principal chamber, opening of the linkage channel between the secondary chamber and the principal chamber.

explosion: of the gases contained in the secondary chamber in the principal cylinder through the linkage channel, during this stroke the volume of the secondary chamber is maintained at its minimum value.

exhaust: of the combustion gases, during this cycle, the volume of the secondary chamber is also maintained at its minimum value.

The arrangement of the small secondary combustion chamber, the opening mode of the linkage channel(s) between the small secondary combustion chamber and the principal combustion chamber, the methods for supplying and pressurizing the gases in the small secondary combustion chamber, the opening and the closing of the aeration valve can use any appropriate means to obtain the required functions without at all changing the principle of the method of the invention. The volume of the small combustion chamber will be chosen as a function of the characteristics sought during operation at low loads and can vary by several percent from that of the principal combustion chamber until possibly equalling it, without at all changing the principle of the method of the invention.

The method according to the invention applies to internal four-stroke combustion engines with spark or other ignition with one or several cylinders, with cam shaft or valve timing or otherwise, nonetheless it appears that the method according to the invention finds an application more particularly easy to obtain in the case of a rotary timing engine in which the timing rotor will also serve to ensure in its rotation the cycled linkage between the principal combustion chamber and the secondary combustion chamber.

The invention also relates to several devices which can be implemented for the application of the method according to the invention, especially in the case of an engine equipped with rotary timing with a unique lateral transfer port assuring successively the exhaust then the intake, while the body of the distributor obstructs the combustion chamber during the compression stroke and the explosion stroke, characterized by the joining, in another transverse plane, of a small secondary combustion chamber, opening up on the rotary distributor, and supplied, by an independent intake circuit, with a compressed fuel-air mixture by a small piston itself controlled by a cam, enabling during the operation of the engine, induction by the intake circuit independent of that of the principal cylinder, of a fuel-air mixture, compressing it in the small volume of the secondary combustion chamber, and maintaining substantially constant the small volume of this combustion chamber while in the cycle, and after having ignited by means of a spark plug, the mixture in the secondary combustion chamber, the rotary distributor in which is (are) cut one (several) linkage channel(s), goes into its rotation, through this (these) linkage channel(s) connects the two chambers so that on the one hand, during operation at low loads, the gases burned in the secondary chamber explode in the principal chamber which in this case of operation is only supplied with air (without fuel) thus pushing the piston that assures the power stroke, and that, on the other hand, during average or full load operation, the gases burned in the secondary chamber come to ignite the mixture contained in the principal chamber, which, in this case of operation is supplied with a fuel-air mixture and, enables the combustion and the explosion of the gases contained both in the principal chamber and in the secondary chamber pushing the piston and thus assuring the power stroke.

During low load operation, while the cylinder and the principal combustion chamber are only supplied with fresh air without fuel, an electrovalve will open during the induction stroke and compression stroke to connect the principal chamber with the atmosphere, in order to avoid the pumping efforts during induction, and the counter pressure on the piston during the compression stroke, and closes during the explosion stroke and exhaust stroke.

During average or full load operation, this electrovalve always stays closed to enable the normal operation of the cylinder.

An engine equipped according to the method and device according to the invention operate in fact as a small cubic capacity engine when one requires little power (thus at actual full load with good efficiency and little specific consumption) and like a large cubic capacity engine when one needs more power (thus at average or full load with good efficiency and little specific consumption).

BRIEF DESCRIPTION OF THE DRAWINGS

Other objects, advantages and characteristics of the invention will appear upon reading the non-limiting description of several embodiments of the invention applied to controlling the combustion of a four-stroke engine, made in reference to the attached drawings wherein.

DETAILED DESCRIPTION OF THE PREFERRED EMBODIMENTS

The engine schematically represented in FIGS. 1 through 7 comprises elements that are well known in rotary distribution engines, operating according to the four-stroke cycle. A piston 1, sliding in a cylinder liner 2 is covered by a cylinder head 3 in which is driven, at half speed of the engine, a rotary distributor 4, with a unique transfer port 5, which during its rotation (in the direction of the arrow) will successively connect the exhaust conduit 6 and the combustion chamber 7 in order to assure the exhaust stroke, then the combustion chamber 7 with the induction 8 thus assuring the induction stroke, the body of the rotary distributor 4 blocking the combustion chamber 7 during the compression stroke and the combustion or power stroke, the impermeability of the chamber being assured by the sliding element 9. Supplying the cylinder with fuel is assured by the injector 10, and the air flow controlling the fuel-air load of the cylinder by the throttle 11.

FIGS. 1–9 show the engine at different phases of its operation, where, to simplify understanding of the drawings, the transverse section is offset at the level of the combustion chambers 7 and 12, gasket rings 9 and 12B, and pistons 1 and 17, and shows these elements on the same plane whereas in reality they are not on the same transverse plane, while the induction conduit 8, the transfer port 5 and the exhaust conduit 6 represented by dashed lines are substantially on the same plane as the principal combustion chamber 7 and its gasket ring 9.

Figure 1:
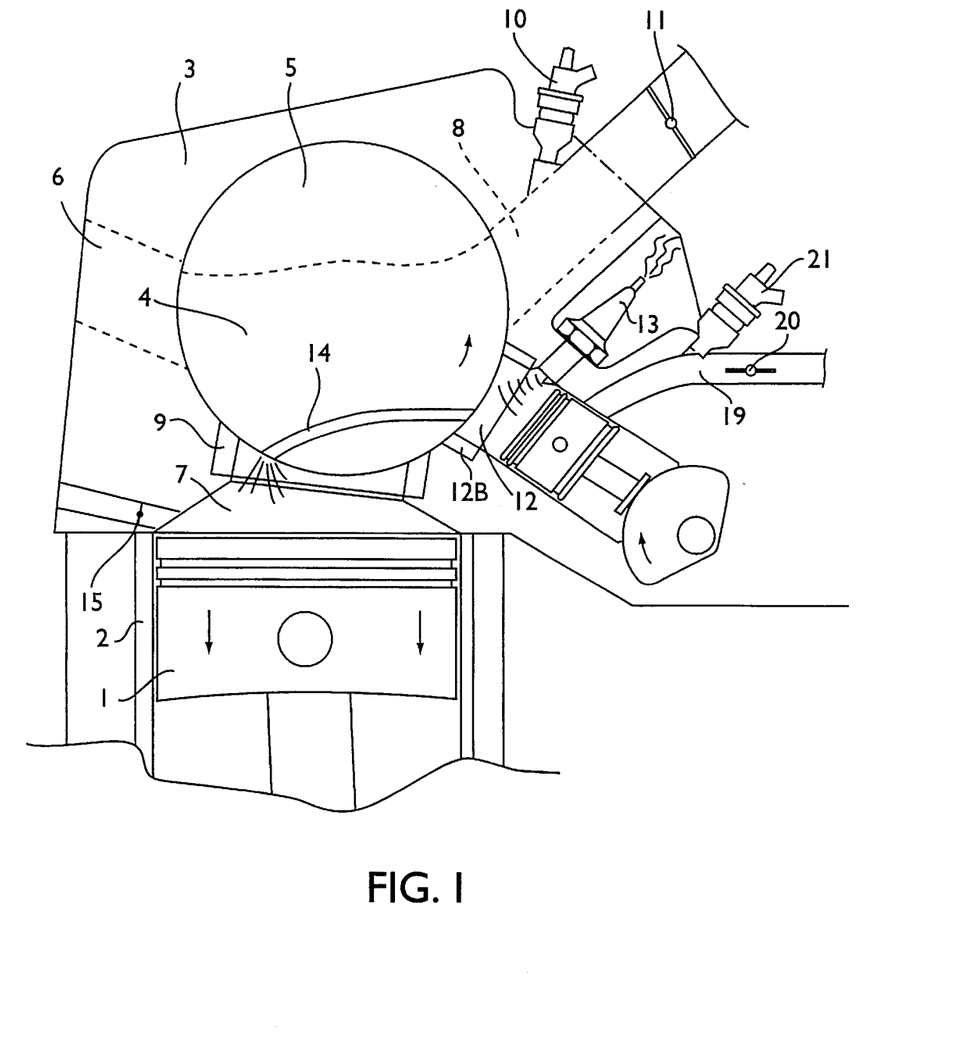
FIG. 1 schematically represents, seen in a transverse section, a four-stroke engine with spark ignition, with rotary timing, with top dead center ignition, equipped with a device for controlling the combustion according to the method of the invention, in a low load mode of operation.

FIG. 1 represents at top dead center ignition a rotary distribution engine such as described above and equipped with a device enabling application of the method according to the invention, in a low load mode of operation, seen in a transverse section (offset at the level of the cylinders) where the compressed fuel-air mixture contained in the small secondary combustion chamber 12, has just been ignited by the spark plug 13 while the transfer port 14 arranged in the rotary distributor 4 connects the principal or primary combustion chamber 7 with the secondary combustion chamber 12 and the fuel-air mixture ignited in the latter expands through the transfer port 14 into the principal chamber 7 pushing the piston 1 and thus assuring the power stroke at low loads; the gas throttle supplying the principal combustion chamber 7 is closed as well as the aeration electrovalve 15.

Figure 2:
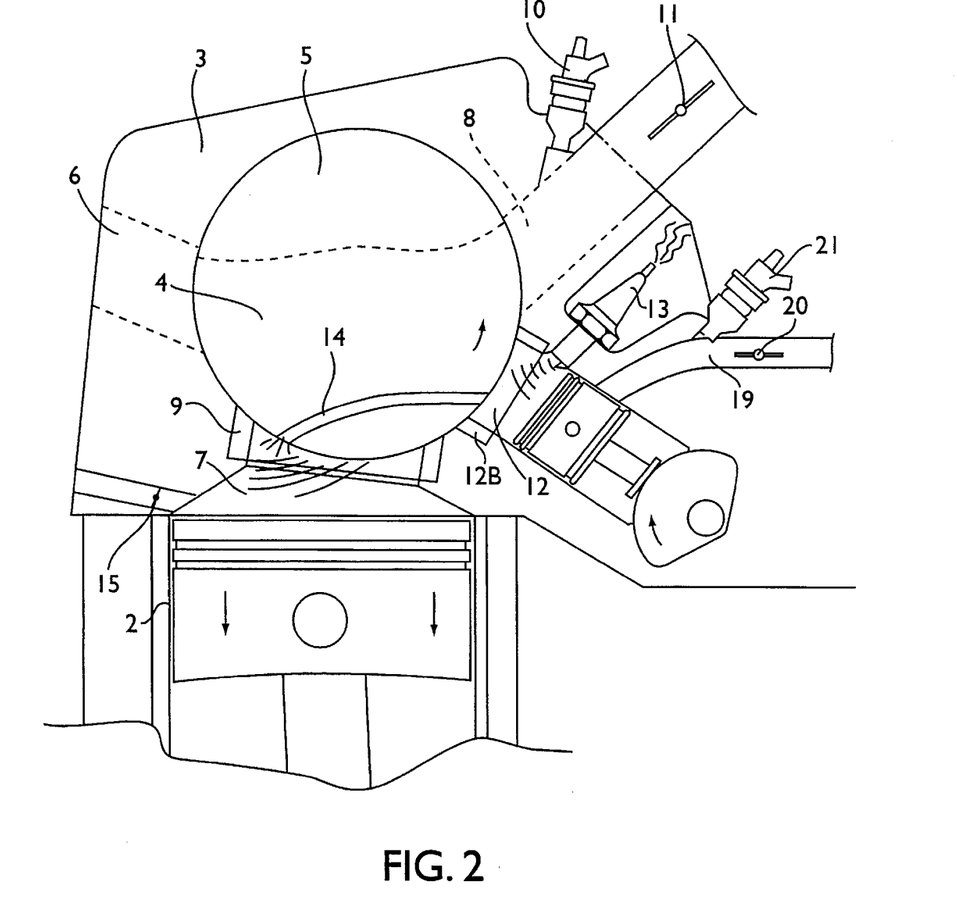
FIG. 2 represents the same engine at the same moment in the cycle, in the average/full load mode of operation.

FIG. 2 represents the same engine similarly equipped at the same moment in the cycle but whereas it operates in average/full load mode, the gas throttle 11 is then opened and the injector 10 supplied the chamber during the induction stroke, the "flame jet" from the combustion of the secondary chamber ignites in turn the fuel-air mixture of the principal chamber and the gases contained in the two chambers expand pushing the piston thus assuring the power stroke.

One consequently understands all the advantages of the method as well as of the device above.

Figure 3:
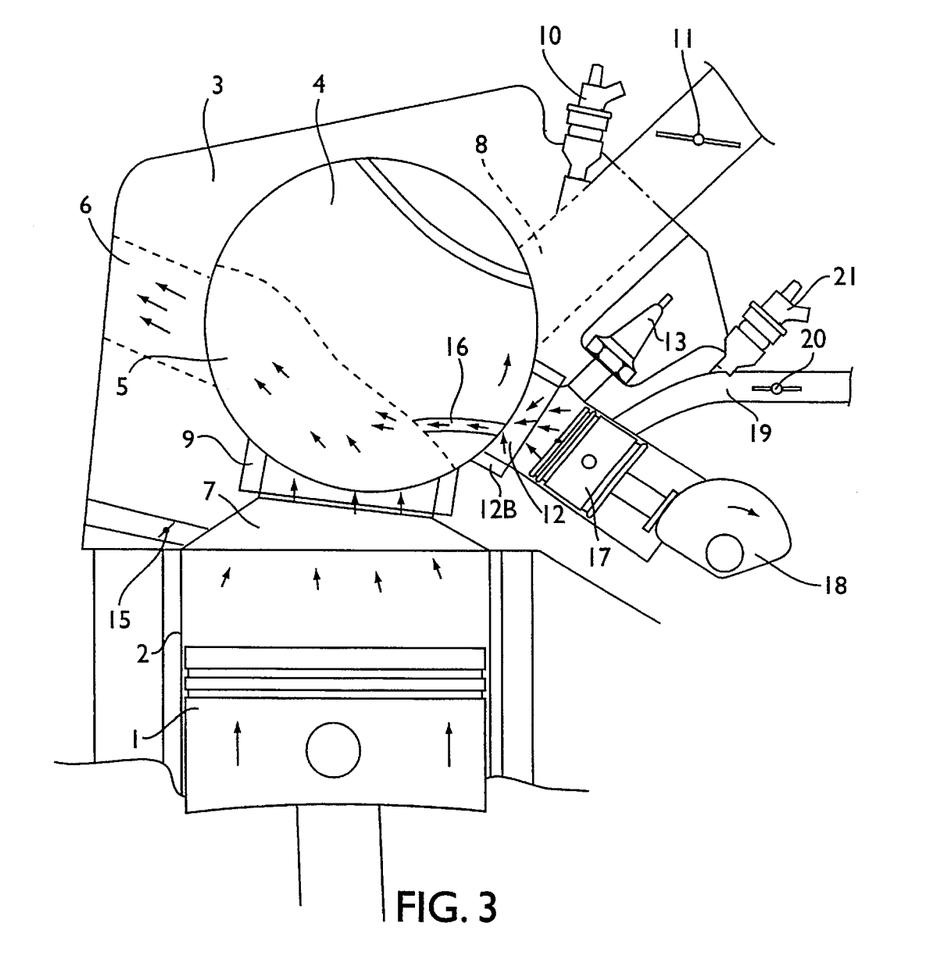
FIG. 3 represents this engine during the exhaust stroke.

The exhaust is carried out normally, FIG. 3 by the exhaust conduit 6 and empties the cylinder, the combustion chamber 7 as well as the secondary combustion chamber 12 through an orifice 16 arranged for that purpose, the secondary piston 17 controlled by a double acting cam 18 (or positive drive control) is maintained substantially at its top dead center to reduce to the maximum the volume to be emptied during this cycle: this cycle is common to the two modes of operation, at low loads, and at average/full loads.

Figure 4:
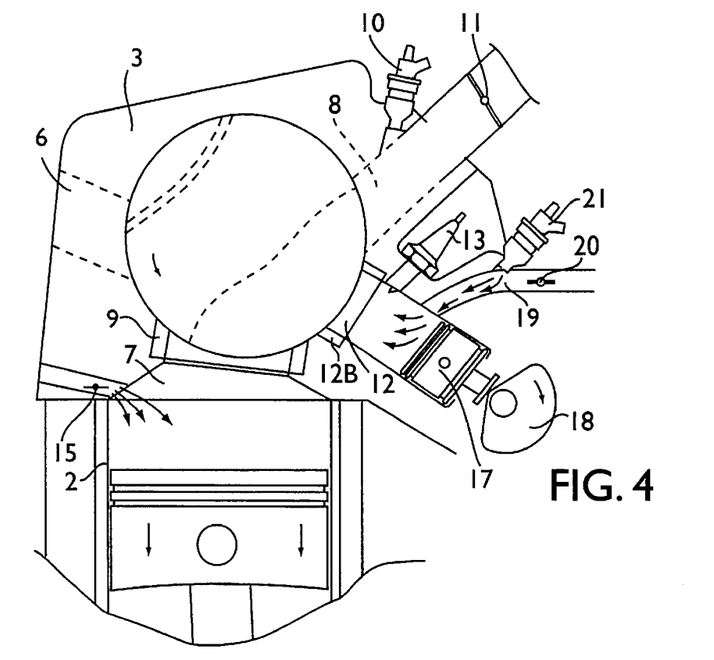
FIG. 4 represents this engine during the induction stroke in the mode of operation at low loads.

FIG. 4 represents the engine during the induction stroke in a low load mode of operation, the gas throttle 11 is closed, injector 10 is not activated, the aeration valve 15 is open to avoid a pumping brake during the descent of the piston 1; the secondary piston 17 returned by the cam 18 uncovers the secondary induction circuit 19 to admit the fuel-air mixture dosed by the injector 21, the fine steering/control of the engine is carried out by means of the secondary gas throttle 20.

Figure 5:
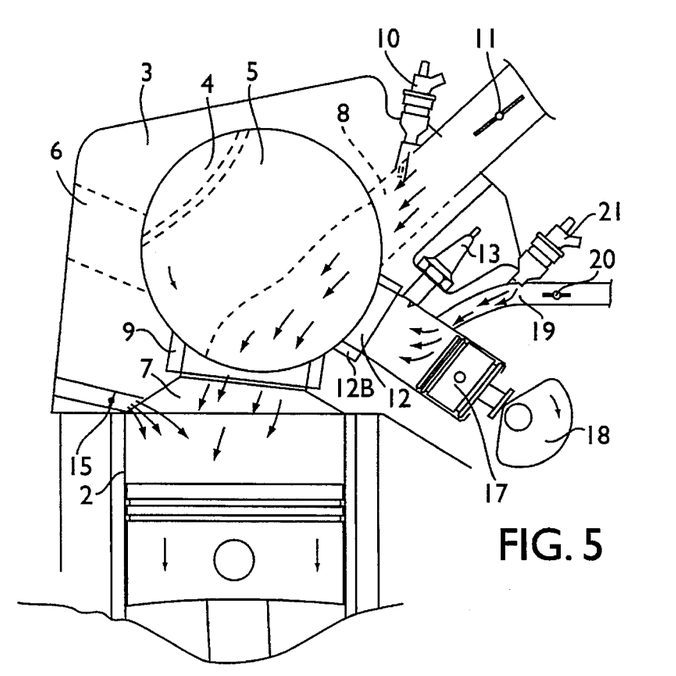
FIG. 5 represents the engine during the induction stroke in the average/full load mode of operation.

FIG. 5 represents the engine during the induction stroke at a average/full load mode of operation, the gas throttle 11 is open, the injector 10 activated, and the fuel-air mixture is admitted into the cylinder through the transfer port 5 arranged in the rotary distributor 4; the secondary piston 17 returned by the cam 18 uncovers the secondary admission circuit 19 to admit the fuel-air mixture dosed by the injector 21, the secondary gas throttle 20 is open, and the aeration electrovalve 15 of the principal combustion chamber 7 is closed.

Figure 6:
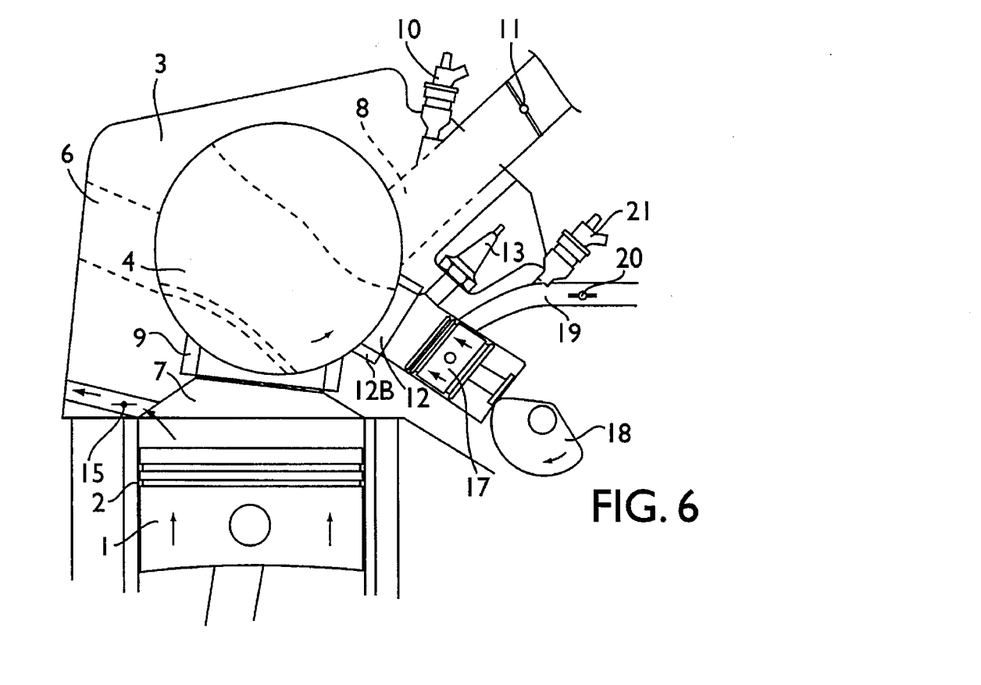
FIG. 6 represents the engine during the compression stroke in the low load mode of operation.

FIG. 6 represents the engine during the compression stroke in a low load mode of operation, the principal piston 1 carries out its ascendant path whereas the aeration electrovalve 15 is open in order to avoid counter pressures on the piston 1; the cam 18 pushes the secondary piston 17 to compress the fuel-air mixture in the secondary chamber 12 blocked by the body of the rotary distributor 4, the impermeability being assured by the sliding ring 12B. At the end of compression air without fuel is thus found in the principal chamber 7 and a compressed fuel-air mixture in the secondary combustion chamber 12.

Figure 7:
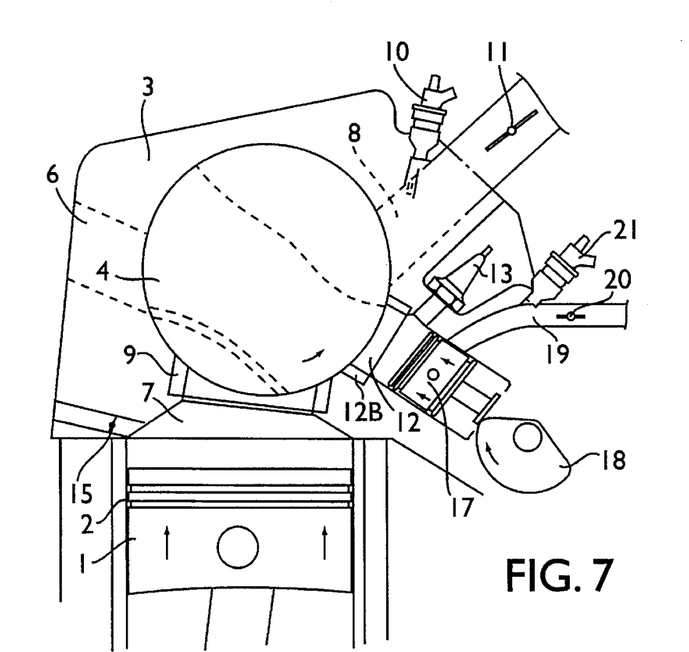
FIG. 7 represents the engine during the compression stroke in the average/full load mode of operation.

FIG. 7 represents the engine during the compression stroke in the average/full load mode of operation, the principal piston 1 carries out its ascendant course whereas the aeration electrovalve 15 is closed, and compresses the fuel-air mixture in the principal combustion chamber 7, the impermeability of the chamber is assured by the sliding ring 9; the cam 18 pushes the secondary piston 17 to compress the fuel-air mixture in the secondary chamber 12 blocked by the body of the rotary distributor 4, the impermeability being assured by the sliding ring 12B. At the end of compression, fuel-air mixtures are found in the principal chamber 1 and in the secondary chamber 12.

The cycle in the low load mode of operation starts again by ignition and explosion such as described in FIG. 1.

The cycle in the average/full mode of operation starts again by ignition and explosion such as described in FIG. 2.

Figure 8:
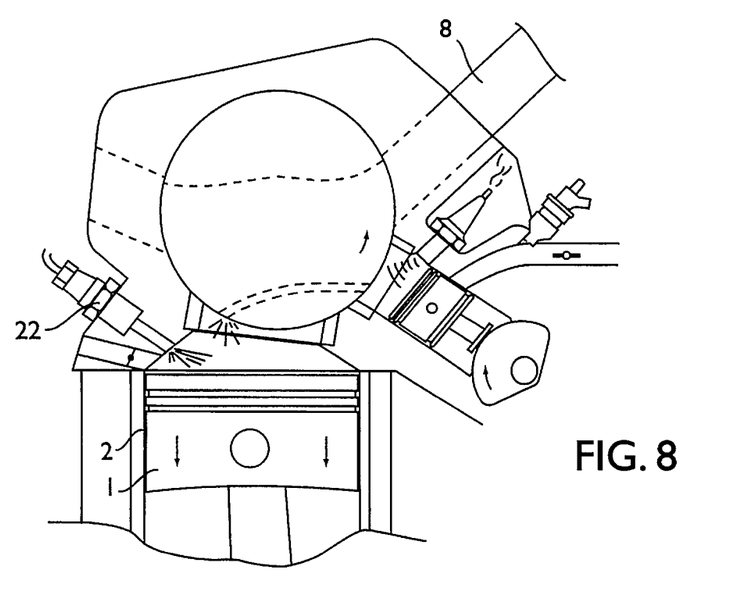
FIG. 8 schematically represents, seen in a transverse section, a four-stroke rotary distribution engine, equipped with a device for controlling the combustion according to the method of the invention, where the principal combustion chamber operates with heterogeneous mixtures like a diesel engine.

The method and the devices according to the invention also apply in the case of engines operating with heterogeneous mixtures, with self ignition more commonly called "diesel" engine, operating with gas oil or other heavy fuels, two cases can be obtained, either a mixed method where the small combustion chamber operates with an ignition controlled by spark plug, whereas the principal cylinder is supplied with gas oil and operates on a heterogeneous mixture, the start of combustion being controlled by the opening of the linkage channel 14. FIG. 8 shows an engine thus equipped, seen in a transverse section (offset) where a direct fuel injector 22 has been installed in the principal combustion chamber 7.

Figure 9:
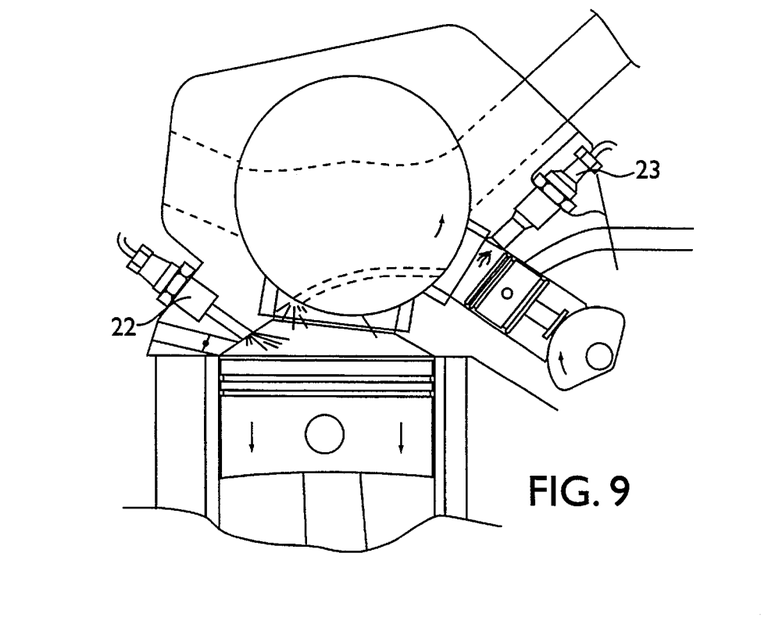
FIG. 9 represents the same engine whereas the principal combustion chamber and the small secondary combustion chamber operate on heterogeneous mixtures.

In addition, the method and devices according to the invention also apply in the case of engines entirely using a heterogeneous mixture where the small secondary combustion chamber also operates like a diesel engine; FIG. 9 shows an engine thus equipped, seen in a transverse section where a fuel injector 23 has been installed in the secondary combustion chamber 12.

Figure 10:
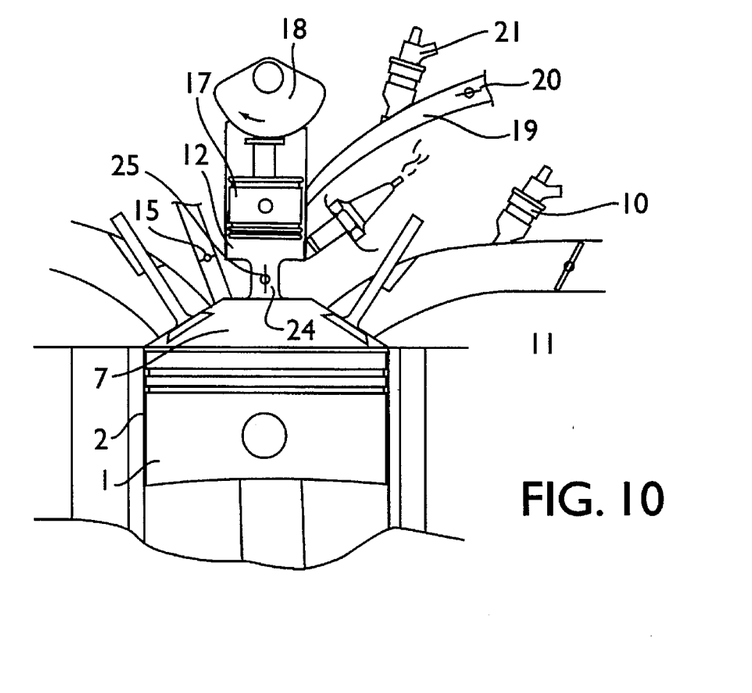
FIG. 10 represents a device according to the method according to the invention applied to a valve engine.

FIG. 10 represents a device according to the method as per the invention applied to a valve timing engine, a transfer or linkage port 24 is arranged in the upper portion of the principal combustion chamber that it connects to a small secondary combustion chamber 12, supplied with a compressed fuel-air mixture by a piston 17, and a secondary induction circuit comprised of a conduit 19, an injector 21 and a gas throttle 20; the secondary piston is controlled by a double acting cam 18. A shutter/plug 25 is positioned in the transfer port 24 and connects, during its cycled opening, the small secondary combustion chamber 12 and the principal combustion chamber 7. The low load and average/full load modes of operation and the course of the cycles are the same as previously described.

Figure 11:
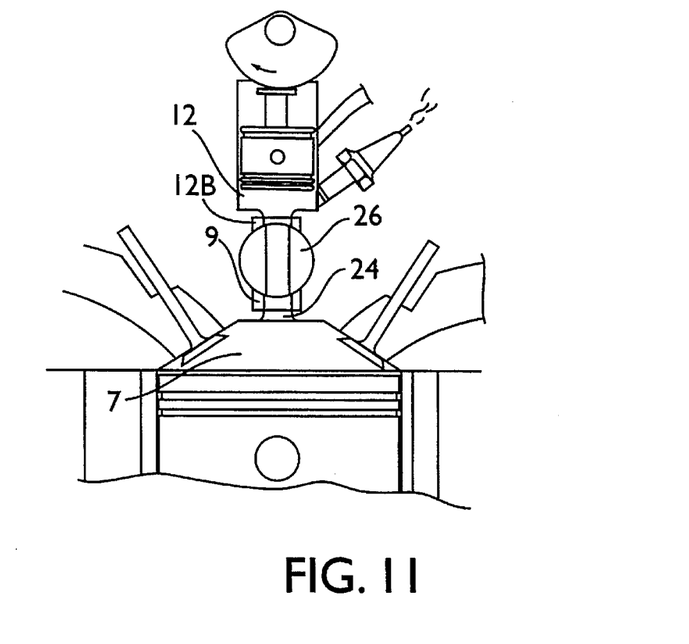
FIG. 11 represents an inter-chamber blocking device with a rotary slide valve/oscillating cylindrical valve.

FIG. 11 represents, in a valve engine equipped according to the method of the invention a shutter/plug device of the transfer port 24 using a rotary distributor 26 comprising a transfer conduit 27 traversing it, while the impermeability of the principal combustion chamber 7 is assured by a sliding ring 9 and while the impermeability of the small secondary combustion chamber 12 is assured by a sliding ring 12B. This rotary distributor 26 is driven at one-fourth of the speed of the crankshaft if the gasket rings 9 and 12B are on the same transverse plane or at half speed if the rings 9 and 12B are on a different plane and will connect the two combustion chambers substantially at top dead center ignition to enable the operation according to the method as per the invention.

Of course, the present invention is not at all limited to the embodiments described and represented; it is capable of numerous variations accessible to one with ordinary skill in the art, according to the applications envisioned and without departing from the scope of the invention.

I claim:

1. A device for controlling combustion of a four-stroke rotary timing engine, the engine including at least one cylinder and cylinder liner, a primary piston mounted for reciprocation within said cylinder, a primary induction circuit that includes an induction conduit, an exhaust conduit, a primary combustion chamber in which a fuel-air mixture is compressed by the primary piston, the fuel-air mixture being ignited in the primary combustion chamber, and a gasket ring for sealing the primary combustion chamber, said device having a low load mode of operation and a full load mode of operation, said device comprising:

a rotary distributor mounted for rotation on and with respect to the assembly of said cylinder, cylinder liner, piston, primary combustion chamber, and gasket ring;

said rotary distributor having a lateral transfer port for successively connecting said exhaust conduit with said primary combustion chamber and said primary combustion chamber with said induction conduit, said induction conduit, exhaust conduit, and transfer port lying substantially within a common plane;

a secondary combustion chamber, smaller than said primary combustion chamber and lying in a plane different from said common plane, a gasket ring for sealing said secondary combustion chamber with respect to said rotary distributor;

a secondary induction circuit for supplying an independent fuel-air mixture to said secondary combustion chamber, said secondary induction circuit being separate from said primary induction circuit, said secondary induction circuit comprising a secondary induction conduit, fuel injector, and gas throttle;

a secondary piston mounted for compressing said independent fuel-air mixture within said secondary combustion chamber;

means for igniting said independent fuel-air mixture following induction of said fuel-air mixture and compression thereof within said secondary combustion chamber;

said rotary distributor having a linkage channel, separate from said transfer port, for communicating said primary combustion chamber with said secondary combustion chamber for ensuring expansion of an ignited fuel-air mixture from said secondary combustion chamber to said primary combustion chamber to push said primary piston and thus ensure a power stroke of the engine;

means for supplying said primary combustion chamber with only air in said low load mode of operation, said ignited fuel-air mixture in said secondary combustion chamber expanding through said linkage channel to said primary combustion chamber to push said primary piston and thus ensure a power stroke of the engine.

means for supplying said primary combustion chamber with a fuel-air mixture in said full load mode of operation, said ignited fuel-air mixture in said secondary combustion chamber issuing a flame jet from said secondary combustion chamber through said linkage channel to said primary combustion chamber for igniting said fuel-air mixture in said primary combustion chamber, whereby expansion of gases of combustion from said secondary combustion chamber and said primary combustion chamber expand and push said primary piston and thus ensure a power stroke of the engine.

2. A device according to claim 1, wherein:

said rotary distributor further comprises an exhaust orifice for communicating said secondary combustion chamber with said exhaust conduit during said exhaust stroke;

the device further comprises a double-acting drive cam control for said secondary piston for compressing said fuel-air mixture in said secondary combustion chamber, said cam control comprising means for maintaining said secondary piston at a top dead center position during compression, power, and exhaust strokes, and for maintaining said piston at a bottom dead center position during an induction stroke for enabling induction of said independent fuel-air mixture.

3. A device according to claim 1, further comprising:

an aeration valve movable between an open position and a closed position within an aeration orifice in communication with said primary combustion chamber, said aeration valve being positionable in the closed position in said full load mode of operation and positionable in the open position during said induction stroke and said compression stroke in said low load mode of operation for aeration of said primary combustion chamber.

4. A device according to claim 1, wherein:

said secondary induction circuit comprises a direct injector for supplying said secondary combustion chamber with a heterogeneous fuel-air mixture.

5. A device according to claim 1, wherein:

said primary induction circuit comprises a direct injector for supplying said primary combustion chamber with a heterogeneous fuel-air mixture and a fuel circuit under pressure.

6. A device according to claim 4, wherein:

said primary induction circuit comprises a direct injector for supplying said primary combustion chamber with a heterogeneous fuel-air mixture and a fuel circuit under pressure.

7. A device according to claim 1, wherein:

said means for igniting said independent fuel-air mixture within said secondary combustion chamber comprises a spark plug.

8. A four-stroke engine comprising the device according to claim 1 for controlling combustion.

9. A device for controlling combustion of a four-stroke valve timing engine, the engine including at least one cylinder and cylinder liner, a primary piston mounted for reciprocation within said cylinder, a primary induction circuit that includes an induction conduit and an intake valve therein, an exhaust conduit and an exhaust valve therein, a primary combustion chamber in which a fuel-air mixture is compressed by the primary piston, the fuel-air mixture being ignited in the primary combustion chamber, said device having a low load mode of operation and a full load mode of operation, said device comprising:

a secondary combustion chamber, smaller than said primary combustion chamber;

a linkage port positioned above said primary combustion chamber, said linkage port communicating said primary combustion chamber with said secondary combustion chamber;

means for controlling communication between said primary combustion chamber and said secondary combustion chamber through said linkage port;

a secondary induction circuit for supplying an independent fuel-air mixture to said secondary combustion chamber, said secondary induction circuit being separate from said primary induction circuit, said secondary induction circuit comprising a secondary induction conduit, fuel injector, and gas throttle;

a secondary piston mounted for compressing said independent fuel-air mixture within said secondary combustion chamber;

means for igniting said independent fuel-air mixture following induction of said fuel-air mixture and compression thereof within said secondary combustion chamber;

said linkage port ensuring expansion of an ignited fuel-air mixture from said secondary combustion chamber to said primary combustion chamber to push said primary piston and thus ensure a power stroke of the engine;

means for supplying said primary combustion chamber with only air in said low load mode of operation, said ignited fuel-air mixture in said secondary combustion chamber expanding through said linkage port to said primary combustion chamber to push said primary piston and thus ensure a power stroke of the engine;

means for supplying said primary combustion chamber with a fuel-air mixture in said full load mode of operation, said ignited fuel-air mixture in said secondary combustion chamber issuing a flame jet from said secondary combustion chamber through said linkage port to said primary combustion chamber for igniting said fuel-air mixture in said primary combustion chamber, whereby expansion of gases of combustion from said secondary combustion chamber and said primary combustion chamber expand and push said primary piston and thus ensure a power stroke of the engine.

10. A device according to claim 9, wherein:

said means for controlling communication between said primary combustion chamber and said secondary combustion chamber comprises a shutter valve positioned within said linkage port.

11. A device according to claim 9, wherein:

said means for controlling communication between said primary combustion chamber and said secondary combustion chamber comprises a rotary distributor, said rotary distributor having a rotatable transfer conduit therein for enabling cycled opening and closing of said linkage port between said primary combustion chamber and said secondary combustion chamber.

12. A device according to claim 11, further comprising:

a first gasket ring for sealing said rotary distributor with said primary combustion chamber; and a second gasket ring for sealing said rotary distributor with said secondary combustion chamber.

13. A device according to claim 12, wherein:

the engine includes a crankshaft;

said first gasket ring and said gasket ring are positioned along a common transverse plane; and said rotary distributor is driven by the crankshaft at one-fourth speed of the crankshaft in two directions.

14. A device according to claim 12, wherein:

the engine includes a crankshaft;

said first gasket ring and said gasket ring are positioned along different transverse planes; and said rotary distributor is driven by the crankshaft at one-half speed of the crankshaft in a single direction.

15. A device according to claim 9, wherein:

said secondary induction circuit comprises a direct injector for supplying said secondary combustion chamber with a heterogeneous fuel-air mixture.

16. A device according to claim 9, wherein:

said primary induction circuit comprises a direct injector for supplying said primary combustion chamber with a heterogeneous fuel-air mixture and a fuel circuit under pressure.

17. A device according to claim 15, wherein:

said primary induction circuit comprises a direct injector for supplying said primary combustion chamber with a heterogeneous fuel-air mixture and a fuel circuit under pressure.

18. A device according to claim 9, wherein:

said means for igniting said independent fuel-air mixture within said secondary combustion chamber comprises a spark plug.

19. A four-stroke engine comprising the device according to claim 9 for controlling combustion.

20. A method of controlling combustion in a four-stroke engine, the engine including at least one cylinder, a primary piston mounted for reciprocation within said cylinder, a primary induction circuit that includes an induction conduit, an exhaust conduit, a primary combustion chamber, a secondary combustion chamber, smaller than said primary combustion chamber, a secondary cylinder, a secondary induction circuit for supplying an independent secondary fuel-air mixture to said secondary cylinder, said secondary induction circuit being separate from said primary induction circuit, said secondary induction circuit comprising a secondary induction conduit, fuel injector, and gas throttle, a secondary piston mounted within said secondary cylinder for compressing said secondary fuel-air mixture within said secondary combustion chamber, means for igniting said secondary fuel-air mixture following induction and compression thereof within said secondary combustion chamber, said method comprising the steps of:

inducing said secondary fuel-air mixture into said secondary cylinder, the engine including a low load mode of operation in which no fuel is induced into said primary combustion chamber during said step of inducing said secondary fuel-air mixture into said secondary cylinder;

compressing said secondary fuel-air mixture in said secondary compression chamber;

igniting said secondary fuel-air mixture during compression thereof; and opening a linkage channel between said secondary combustion chamber and said primary combustion chamber following said steps of inducing and compressing said secondary fuel-air mixture shortly before or substantially concurrently with the step of igniting said secondary fuel-air mixture, whereby gases ignited in said secondary combustion chamber explode in said secondary combustion chamber and in said primary combustion chamber through said linkage channel, said step of opening the linkage channel between said secondary combustion chamber and said primary combustion chamber comprises ensuring a power stroke for said primary piston solely by means of explosion of said secondary fuel-air mixture.

21. A method according to claim 20, wherein:

the engine further includes a full load mode of operation comprising the step of inducing into said primary combustion chamber a primary fuel-air mixture during said step of inducing said secondary fuel-air mixture into said secondary cylinder;

said step of opening the linkage channel between said secondary combustion chamber and said primary combustion chamber comprises ensuring a power stroke for said primary piston by means of explosion of said secondary fuel-air mixture and by means of ignition and explosion of said primary fuel-air mixture caused by a flame jet issuing from said explosion of said secondary fuel-air mixture.

22. A method according to claim 20, wherein:

said primary piston is reciprocated through an induction stroke, a compression stroke, a power stroke, and an exhaust stroke;

said method further comprises the step of maintaining a minimum volume of said secondary combustion chamber during said compression stroke, said power stroke, and said exhaust stroke so that explosion of said secondary fuel-air mixture during combustion is efficiently utilized for pushing said primary piston during said power stroke and for exhausting said secondary combustion chamber during said exhaust stroke.

23. A method according to claim 21, wherein the engine further comprises an aeration valve movable between an open position and a closed position within an aeration orifice in communication with said primary combustion chamber, said method further comprising:

during said low load mode of operation in which no fuel is induced into said primary combustion, opening said aeration valve during said induction stroke and during said compression stroke.

24. A method according to claim 23, wherein:

at all times during said full load mode of operation, maintaining said aeration valve closed.

25. A method according to claim 20, wherein:

said secondary induction circuit comprising a direct injector; and the step of inducing said secondary fuel-air mixture into said secondary cylinder comprises supplying said secondary cylinder with a heterogeneous fuel-air mixture.

26. A method according to claim 21, wherein:

said primary induction circuit comprising a direct injector; and the step of inducing into said primary combustion chamber a primary fuel-air mixture comprises supplying said primary cylinder with a heterogeneous fuel-air mixture.

27. A method according to claim 25, wherein:

said primary induction circuit comprising a direct injector; and the step of inducing into said primary combustion chamber a primary fuel-air mixture comprises supplying said primary cylinder with a heterogeneous fuel-air mixture.

28. A method according to claim 20, wherein:

the step of igniting said secondary fuel-air mixture within said secondary combustion chamber is done by means of a spark plug.

\* \* \* \* \*